(12) United States Patent
Heo (10) Patent No.: US 9,864,367 B2
(45) Date of Patent: Jan. 9, 2018

(54) STRAIGHTNESS MANAGEMENT SYSTEM AND CONTROL METHOD THEREOF FOR MOUNTING PIN

(71) Applicant: Hyundai Motor Company, Seoul (KR)

(72) Inventor: Soo Jeong Heo, Asan (KR)

(73) Assignee: Hyundai Motor Company, Seoul (KR)

(*) Notice: Subject to any disclaimer, the term of this patent is extended or adjusted under 35 U.S.C. 154(b) by 653 days.

(21) Appl. No.: 14/488,692

(22) Filed: Sep. 17, 2014

(65) Prior Publication Data

US 2015/0277439 A1 Oct. 1, 2015

(30) Foreign Application Priority Data

Mar. 25, 2014 (KR) ........................ 10-2014-0034939

(51) Int. Cl.
*G05B 19/418* (2006.01)
*G06F 17/10* (2006.01)

(52) U.S. Cl.
CPC ....... *G05B 19/41875* (2013.01); *G06F 17/10* (2013.01); *G05B 2219/37197* (2013.01); *Y02P 90/04* (2015.11); *Y02P 90/22* (2015.11)

(58) Field of Classification Search
CPC .... G05B 19/41875; G05B 2219/37197; G06F 17/10; Y02P 90/04; Y02P 90/22

(Continued)

(56) References Cited

U.S. PATENT DOCUMENTS

| 7,110,910 B1* | 9/2006 | Deffenbaugh | ....... G01B 11/245 702/155 |
| 2008/0062434 A1* | 3/2008 | Diefenbacher | ...... G01B 11/245 356/607 |

(Continued)

FOREIGN PATENT DOCUMENTS

| JP | 06-288762 A | 10/1994 |
| JP | 2008-544253 A | 12/2008 |
| KR | 10-2010-0047801 A | 5/2010 |

*Primary Examiner* — Yuhui R Pan
(74) *Attorney, Agent, or Firm* — Mintz Levin Cohn Ferris Glovsky and Popeo, P.C.; Peter F. Corless (57) ABSTRACT

A mounting pin straightness management system is provided. The system includes a sensor unit that is configured to measure 3-dimensional coordinates ($a(T_a, L_a, H_a)$, $b(T_b, L_b, H_b)$) for a first and a second center point (a, b) of two approximate circles formed from intersections of an exterior surface of the at least one mounting pin and two parallel planes ($P_A$ and $P_B$) perpendicular to a target length direction of the at least one mounting pin and spaced apart at a predetermined distance (H) from each other. A controller is configured to calculate a straightness index (S.I.) related to a maximum distance ($L_{max}$) between the first and the second center point under a straightness management tolerance (r) and an actual distance ($L_{actual}$) between the first and the second center point by receiving the 3-dimensional coordinates of the first and the second center point from the sensor unit.

16 Claims, 8 Drawing Sheets

Straightness Index '0'; $L_{actual} = L_{min}$; Ideal straightness
Straightness Index '1'; $L_{actual} = L_{max}$; Bad straightness
※ Straightness Index '0' < Measurement value range < Straightness Index '1'

(58) Field of Classification Search
USPC .......................................................... 700/109
See application file for complete search history.

(56) References Cited

U.S. PATENT DOCUMENTS

2008/0177417 A1* 7/2008 Kasuga ............ G05B 19/41805
                                                    700/213
2014/0240716 A1* 8/2014 Kenner .................. G01B 11/24
                                                    356/601

* cited by examiner

RELATED ART

STRAIGHTNESS MANAGEMENT SYSTEM AND CONTROL METHOD THEREOF FOR MOUNTING PIN

CROSS-REFERENCE TO RELATED APPLICATION

The present application claims priority of Korean Patent Application Number 10-2014-0034939 filed on Mar. 25, 2014, the entire contents of which application are incorporated herein for all purposes by this reference.

BACKGROUND (a) Field of Invention

The present invention relates to a straightness management system and a control method thereof, and more particularly to a straightness management system of a mounting pin inserted in an aperture for assembly and a control method of the system.

(b) Description of Related Art

In a vehicle body assembly line, generally a front subframe forms a support structure of a front vehicle body by being fixed to a lower side of a left/right front side member in the front of a vehicle body. In addition, in an essential front chassis process among assembly lines of a passenger vehicle, an engine and a transmission are mounted on and supported by the front subframe. In addition, referring to FIG. 3, a front chassis suspension module 4 is connected and mounted to the left/right front side member, which module simultaneously sustains a front vehicle body and reduces impacts or vibrations transferred to the vehicle body through contact of road surface and tires.

Figure 3:
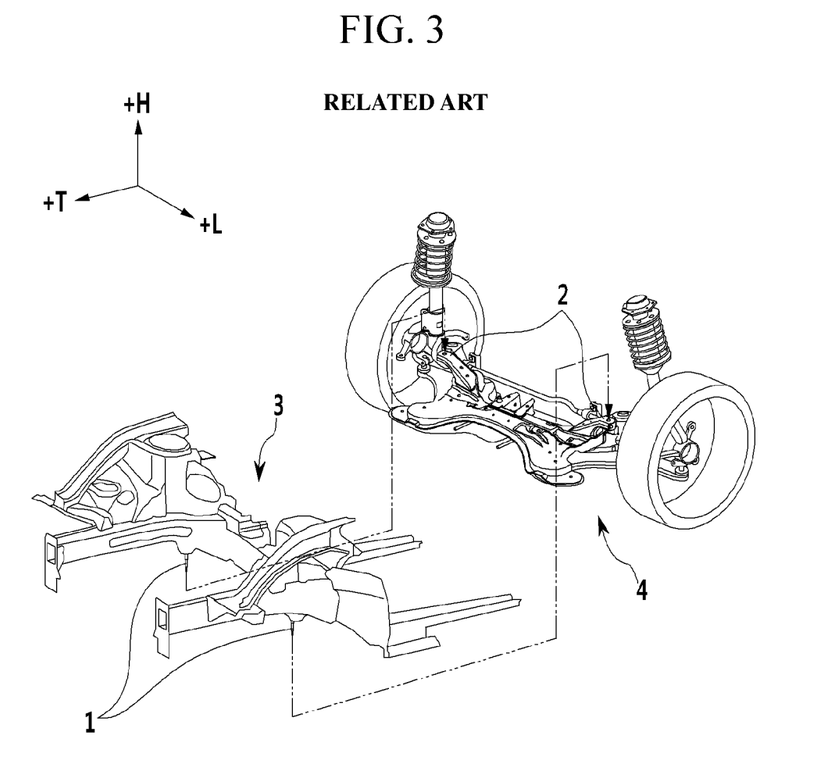
FIG. 3 is an exemplary view showing an example of an assembling process of mounting pins of a front vehicle body structure and apertures of a suspension module according to the related art.

In FIG. 3, assembling portions and methods of a front vehicle body structure 3 comprising a left/right front side member and a mounting pin 1 fixedly mounted to both sides of a lower side of the left/right front side member and the suspension module 4 are shown. In particular, a 3-dimensional coordinate system of T/L/H is used where T stands for a length direction of a vehicle body, L a width direction, and H height direction. As shown in FIG. 3, the mounting pin 1 is used for assembly in the H direction of a vehicle body and chassis parts. Further, a degree of precision for mounting pin 1 has an effect on mounting variance of the suspension module 4 and is directly related to a problem of vehicle tilting during driving. Therefore, quality control is required, but development of a system to measure a mounting pin in assembly lines or a variance management algorithm has not been developed. While precision management of a mounting pin unit is conducted, a degree of precision for mounting pin mounted to a vehicle body before painting, namely, Body in White (BIW) is not managed in an assembly line. Accordingly, the assembly line may unexpectedly stop or a safety accident of a completed vehicle may occur during driving.

The information disclosed in this section is merely for enhancement of understanding of the general background of the invention and should not be taken as an acknowledgement or any form of suggestion that this information forms the prior art already known to a person skilled in the art.

SUMMARY

Various aspects of the present invention are directed to providing a straightness management system and a control method thereof by calculating a straightness of a mounting pin and developing an algorithm that determines an inclined direction of a mounting pin.

In various aspects of the present invention, a mounting pin straightness management system calculating and managing straightness index of at least one mounting pin by measuring 3-dimensional coordinates of center points of the at least one mounting pin may include: a sensor unit configured to measure 3-dimensional coordinates ($a(T_a, L_a, H_a)$, $b(T_b, L_b, H_b)$) for a first and a second center point (a, b) of two approximate circles formed from intersections of an exterior surface of the at least one mounting pin and two parallel planes ($P_A$ and $P_B$) perpendicular to a target length direction of the at least one mounting pin and spaced apart at a predetermined distance (H) from each other and a controller configured to calculate a straightness index (S.I.) related to a maximum distance ($L_{max}$) between the first and the second center point under a straightness management tolerance (r) and an actual distance ($L_{actual}$) between the first and the second center point by receiving the 3-dimensional coordinates of the first and the second center point from the sensor unit.

In the mounting pin straightness management system, the S.I. may be calculated using $$S.I. = \frac{L_{actual} - L_{min}}{L_{max} - L_{min}},$$

where $L_{min}=H$.

The mounting pin straightness management system according to the present invention may further include a basic information/process controller configured to provide the controller with basic information regarding a measurement body at which the at least one mounting pin is mounted or transmit a starting signal of a measuring operation to the controller. The management system may further include a warning device configured to transmit a warning to the controller when the S.I. exceeds a predetermined straightness tolerance or at least one of the first and the second center point ($a(T_a, L_a, H_a)$, $b(T_b, L_b, H_b)$) is beyond a corresponding first or second management circle ($C_A$, $C_B$).

In the mounting pin straightness management system according to the present invention, the controller may further be configured to calculate an inclined direction vector (ab) formed by projecting a connecting line of the first and the second center point onto any one of the two planes ($P_A$ and $P_B$), and may further include a monitor unit executed by the controller to output the $L_{actual}$, the S.I., or the inclined direction vector ab to a screen (e.g., a display screen). The mounting pin straightness management system according to the present invention may further include a sensor moving device configured to move the sensor unit to a predetermined position for the measurement or moving the sensor unit to an original position thereof. The sensor unit of the management system according to the present invention may include a 3-dimensional laser sensor.

In the mounting pin straightness management system according to the present invention a pair of left and right mounting pin may be symmetrically installed, and left and right sensor units and left and right sensor moving devices may respectively form a pair that corresponds to the pair of the mounting pins. The pair of the sensor units may simultaneously be configured to measure the 3-dimensional coordinates and the pair of the sensor moving devices may simultaneously be configured to move each sensor unit.

In various aspects of the present invention, a control method of a mounting pin straightness management system calculating and managing straightness index of at least one mounting pin by measuring 3-dimensional coordinates for center points of the at least one mounting pin may include measuring, by a sensor unit, 3-dimensional coordinates $(a(T_a, L_a, H_a), b(T_b, L_b, H_b))$ of a first and a second center point (a, b) of two approximate circles formed from intersections of an exterior surface of the at least one mounting pin and two parallel planes ($P_A$ and $P_B$) perpendicular to a target length direction of the at least one mounting pin and spaced apart at a predetermined distance (H) from each other and calculating, by a controller, a straightness index (S.I.) related to a maximum distance ($L_{max}$) between the first and the second center point under a straightness management tolerance (r) and an actual distance ($L_{actual}$) between the first and the second center point by receiving the 3-dimensional coordinates of the first and the second center point from the sensor unit.

In the control method, the S.I. may be calculated using $$S.I. = \frac{L_{actual} - L_{min}}{L_{max} - L_{min}},$$

wherein $L_{min} = H$.

In addition, the control method may further include determining, by the controller, whether the S.I. is within a predetermined straightness tolerance, determining, by the controller, whether both of the first and the second center point $(a(T_a, L_a, H_a), b(T_b, L_b, H_b))$ are within a corresponding first and second management circle ($C_A$, $C_B$) respectively, and activating, by the controller, a warning device when at least any one of the two determinations is negative.

The control method according to the present invention may further include determining, by the controller, a measurement body at which the at least one mounting pin is mounted as an offline reexamination body when the warning device is to be activated or outputting, by the controller, contents of the determinations to a screen of a monitor. The control method according to the present invention may further include calculating, by the controller, an inclined direction vector (ab) formed by projecting a connecting line of the first and the second center point onto any one of the two planes ($P_A$ and $P_B$) and outputting the $L_{actual}$, the S.I., or the inclined direction vector (ab) to a screen.

The control method according to the present invention further include collecting, by the controller, basic information regarding a measurement body from a basic information/process controller, receiving, by the controller, a readiness signal of a sensor moving device or a sensor unit, transmitting, by the controller, a start order of a measuring operation to a sensor moving device or a sensor unit, moving, by the controller, a sensor moving device to a predetermined position for a measurement, or moving a sensor moving device to an original position after the measurement is complete.

BRIEF DESCRIPTION OF THE DRAWINGS

The above and other objects, features and advantages of the present invention will be more apparent from the following detailed description taken in conjunction with the accompanying drawings, in which.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
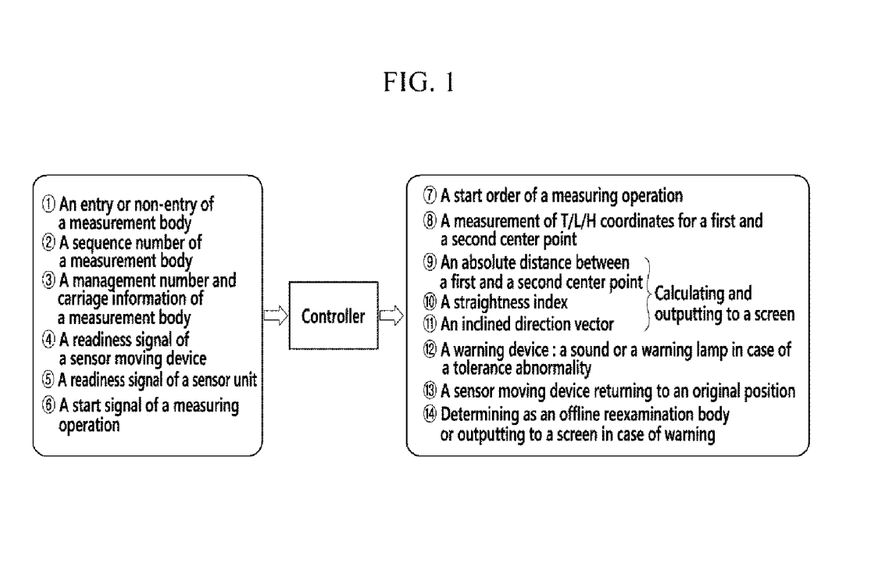
FIG. 1 is an exemplary block diagram of a mounting pin straightness management system according to an exemplary embodiment of the present invention.
Figure 2:
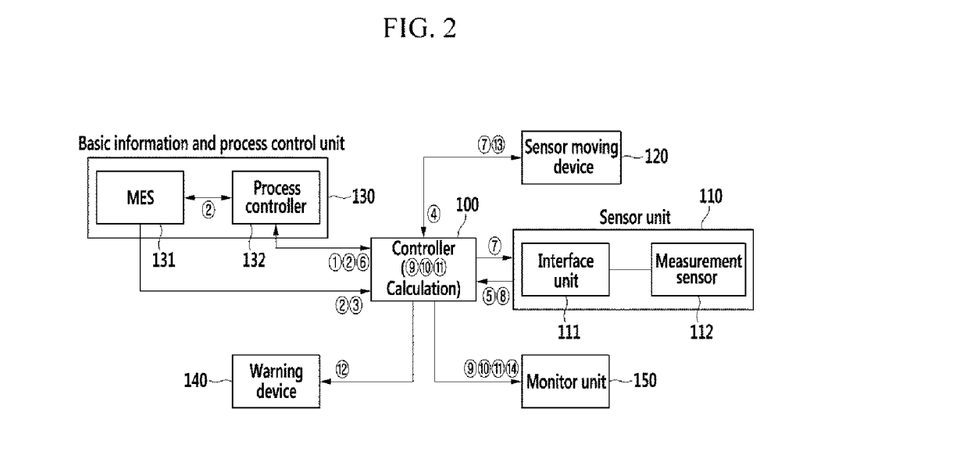
FIG. 2 is an exemplary schematic diagram showing a configuration of a mounting pin straightness management system according to an exemplary embodiment of the present invention.

FIG. 1 is an exemplary block diagram of a mounting pin straightness management system according to an exemplary embodiment of the present invention. FIG. 2 is an exemplary schematic diagram showing a configuration of a mounting pin straightness management system according to an exemplary embodiment of the present invention.

Referring to FIG. 2, a mounting pin straightness management system according to the present invention may include a controller 100, a sensor unit 110, a sensor moving device 120, a basic information/process controller 130, a warning device 140 and a monitor unit 150. The controller 100 may be configured to operate the sensor moving device 120, the warning device 140, and the monitor unit 150. The controller 100 may be configured to receive inputs of basic information such as an entry or non-entry of a measurement body at which at least one mounting pin is mounted, a sequence number of the measurement body, a management number of the measurement body, or carriage information, a start signal of a measuring operation, a readiness signal of the sensor unit 110 or a readiness signal of the sensor moving device 120.

After processing the basic information, the start signal of a measuring operation, or the readiness signals according to a predetermined logic, the controller 100 may be configured to transmit a start order of a measuring operation to the sensor unit 110 and the sensor moving device 120 and may be configured to calculate or output to a screen of the monitor unit 150 an actual distance ($L_{actual}$), which may also be called an absolute distance in 3-dimensional coordinates, between a first and a second center point, a straightness index (S.I.) of a pin, and an inclined direction vector by receiving 3-dimensional coordinates ($a(T_a, L_a, H_a), b(T_b, L_b, H_b)$) for the first and the second center point (a, b) measured by the sensor unit 110. In particular, T stands for a length direction of a vehicle body, L a width direction, and H height direction.

In addition, after comparing the S.I. calculated with a predetermined straightness tolerance, when a finding an occurrence of abnormality (e.g., when the tolerance is beyond a predetermined range) the controller 100 may be configured to transmit an operating order to the warning device 140 or determine, register, or output to a screen the measurement body as an offline reexamination body. The controller 100 may also be configured to move the sensor moving device 120 to an original position and terminate the process. The controller 100 may be constructed in a personal computer (PC).

The sensor unit 110, which may be a device configured to measure T/L/H coordinates for a first and a second center point of a pin, may be configured to receive a measurement start order from the controller 100 and operate in a position predetermined or a position to which the sensor moving device 120 is moved. The sensor unit 110 may include an interface 111 and a measurement sensor 112. The controller 100 may be configured to send a start order to the interface 111.

The measurement sensor 112, which may be a device configured to measure 3-dimensional coordinates for a first and a second center point (hereinafter explained), may be a 3-dimensional laser sensor. The sensor moving device 120 may be a device configured to move the sensor unit 110 to a predetermined position to allow the sensor unit 110 to measure T/L/H coordinates for a first and a second center point of a pin. The basic information/process controller 130 may be a unit configured to transmit basic information such as an entry or non-entry of a measurement body at which at least one mounting pin is mounted, a sequence number of the measurement body, a management number of the measurement body, or carriage information and a start signal of a measuring operation to the controller 100. The basic information/process controller 130 may include a manufacturing execution system (MES) 131 and a process controller 132.

The MES 131 and the process controller 132 may be configured to transmit, respectively, carriage information and a start signal of a measuring operation to the controller 100 when a management number and a sequence number of the measurement body which the MES 131 and the process controller 132 respectively hold are compared and substantially identical. Accordingly, a straightness management of a mounting pin in a BIW may be more accurately accomplished according to a prearranged sequence. Since an operation or comparison of the MES 131, the process controller 132, the sequence number, the management number and the carriage information are obvious to those skilled in the art to which the present invention belongs, detailed description is omitted.

The warning device 140 may be a device configured to warn of an occurrence of abnormality (e.g., when tolerance or other values are beyond a predetermined range) in the straightness of a mounting pin by receiving an order from the controller 100. The method of providing the warning may be a sound, a warning lamp, or flickering light, etc. The monitor unit 150 may be a device configured to output an actual distance (e.g., an absolute distance) between a first and a second center point, a straightness index (S.I.) of a pin, or an inclined direction vector by receiving an order from the controller 100. The monitor unit 150 may be a PC monitor.

Figure 4:
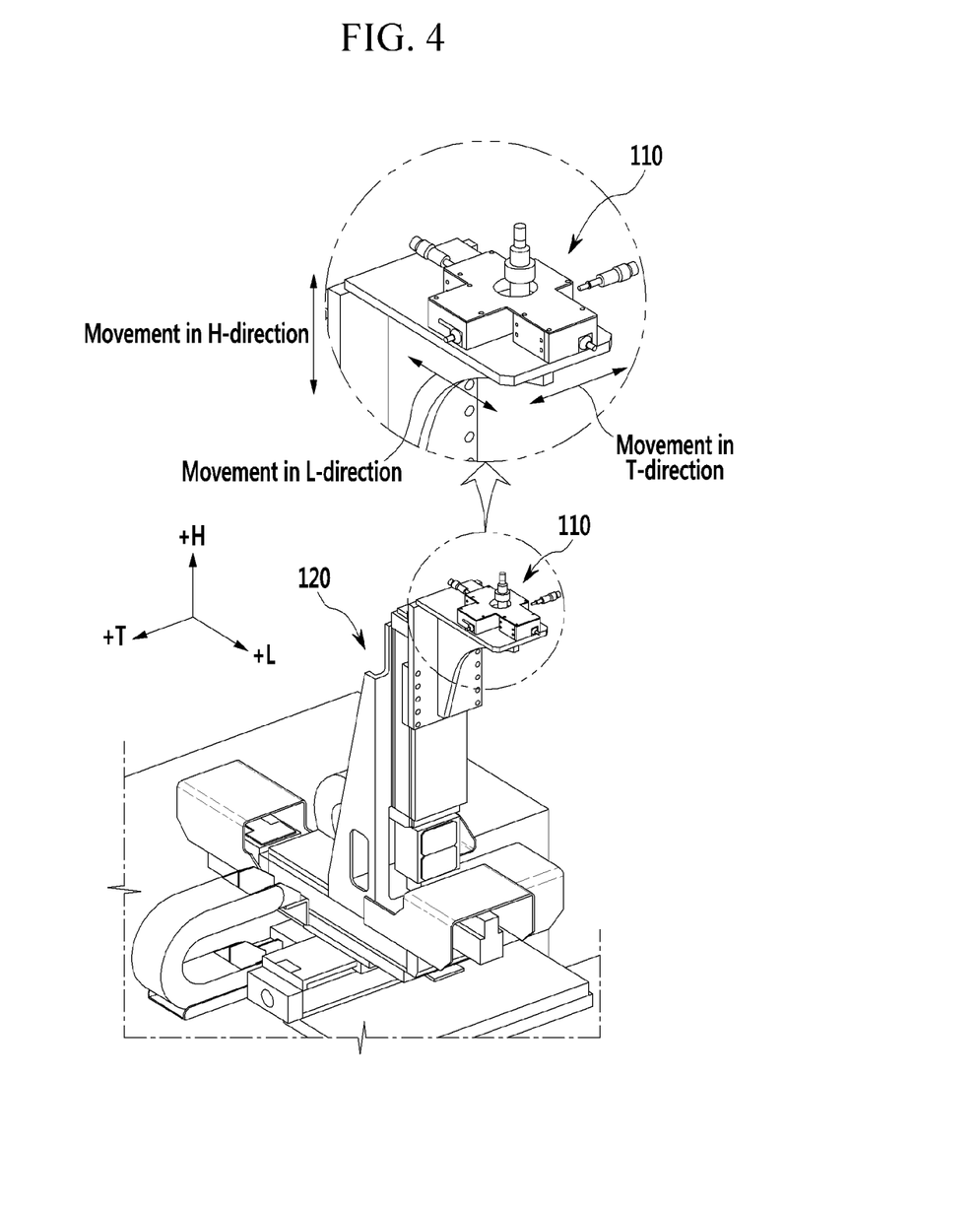
FIG. 4 is an exemplary view showing a sensor moving device and a sensor unit of a mounting pin straightness management system according to an exemplary embodiment of the present invention.

Comparing FIG. 1 and FIG. 2, configurations and operation principles of the controller 100, the sensor unit 110, the sensor moving device 120, the basic information/process controller 130, the warning device 140 and the monitor unit 150 according to the present invention may be understood. Same numbers in FIG. 1 and FIG. 2 have one to one correspondence. FIG. 3 is an exemplary view showing an example of an assembling process of mounting pins of a front vehicle body structure and apertures of a suspension module. FIG. 4 is an exemplary view showing a sensor moving device and a sensor unit of a mounting pin straightness management system according to an exemplary embodiment of the present invention.

As shown in FIG. 3, when a straightness of a mounting pin 1 is insufficient and an inclination is generated in a length direction of the mounting pin 1, namely –H direction, assembling a front vehicle body structure 3 and a suspension module 4 may become difficult. Even when assembled, henceforward a steering pull problem may occur while a completed vehicle is being driven. The front vehicle body structure 3 may include a left/right front side member and mounting pins 1 mounted on both lower portions of the left/right front side member. Accordingly, a pair of the left and the right mounting pin 1 may be installed symmetrically.

Referring to FIG. 4, it can be understood that the sensor moving device 120 may be movable 3-dimensionally in a length direction T, a width direction L, and a height direction H of a vehicle body. In an exemplary embodiment of FIG. 4, the measurement sensor 112 of the sensor unit 110 may be a 3-dimensional laser sensor. In FIG. 4, one sensor unit 110 and one sensor moving device 120 are shown. Therefore, FIG. 4 shows one sensor unit 110 and one sensor moving device 120 configured to measure both of the left and the right mounting pin 1.

Further, in another exemplary embodiment left and right sensor units 110 and left and right sensor moving devices 120 may respectively form a pair corresponding to the pair of the mounting pins 1. The pair of the sensor units 110 may be configured to simultaneously measure and the pair of the sensor moving devices 120 may be configured to simultaneously move. In above case, FIG. 4 corresponds to a drawing showing only left portions of the pair of the left and right sensor units 110 and the pair of the left and right sensor moving devices 120. In other words, FIG. 4 is an exemplary drawing to be able to express both of the two exemplary embodiments.

Figure 5:
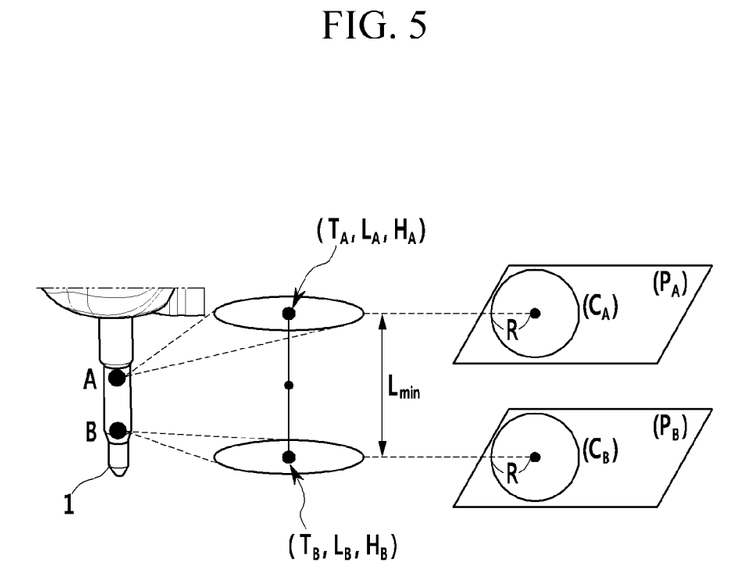
FIG. 5 is an exemplary drawing illustrating a measurement point, measuring principles, and a center point maximum tolerance R of a mounting pin straightness management system according to an exemplary embodiment of the present invention.

FIG. 5 is an exemplary drawing illustrating an ideal measurement point, measuring principles, and a center point maximum tolerance R of a mounting pin straightness management system according to the present invention. In FIG. 5, it may be assumed that a mounting pin 1 is a substantially cylindrical pin so that a length direction of the mounting pin 1 may be parallel to an H-axis and a cross-section of the mounting pin 1 may be substantially circular. Therefore, the mounting pin 1 may have no inclination with respect to the H-axis and may be assembled with a suspension module 4 in a simplified manner. In another words, the above case corresponds when a straightness explained hereinafter is the optimal, the length direction of the mounting pin 1 is a target length direction of an actual mounting pin 1, and the circle forming the cross-section of the mounting pin 1 is a target cross-section of an actual mounting pin 1.

Upper and lower two figures formed from intersections of an exterior surface of the ideal mounting pin 1 and upper and lower two parallel planes ($P_A$ and $P_B$) perpendicular to an H-axis, namely, a target length direction of an actual mounting pin 1 and spaced apart at a predetermined distance (H) such that a minimum distance between $P_A$ and $P_B$ becomes H may be substantially circular. In addition, A and B in FIG. 5 stand for center points of no other than these upper and lower circles. Accordingly, the A and the B represent upper and lower two measurement points measured by a sensor unit 110 and may function as reference points in a measurement or a straightness management. Further, the A and the B may be on the two planes $P_A$ and $P_B$ respectively.

Hereinafter, the A and the B stand for a first and a second center point, respectively. An absolute distance between the A and the B may be a difference between those two coordinate values of an H-axis. A coordinate of a first center point A may be expressed as $(T_A, L_A, H_A)$ and a coordinate of a second center point B may be expressed as $(T_B, L_B, H_B)$. Accordingly, when the minimum distance between the first and the second center point A and B may be expressed as $L_{min}$, $L_{min} = H (= H_A - H_B)$.

A mounting pin straightness management system according to the present invention may acquire 3-dimensional coordinates of a first and a second center point A and B by measuring master pins functioning as target pins using a sensor unit 110 with the master pins mounted on at both lower portions of a left/right front side member and use the 3-dimensional coordinates in measuring a first and a second center point of an actual mounting pin 1 and calculating a straightness index (S.I.). In particular, when the management system includes a sensor moving device 120, 3-dimensional coordinates of a first and a second center point of a mounting pin 1 may be acquired by moving the sensor moving device 120 as much as the management system moved the sensor moving device 120 in a T/L/H direction respectively for the measurement of the master pins.

Hereinafter, a first and a second center point acquired by measuring a mounting pin 1 will be expressed as a and b respectively for consistency of symbols. Figures formed from intersections of an exterior surface of an actual mounting pin 1 and two parallel planes ($P_A$ and $P_B$) perpendicular to a target length direction of the actual mounting pin 1 and spaced apart at a predetermined distance (H) are approximate circles approaching an ideal circle and a and b stand for center points of those approximate circles respectively.

The circles may be considered approximate since the mounting pin 1 may not be exactly parallel to an H-axis and may be slightly inclined. Therefore, the first and the second center point, a and b represent upper and lower actual measurement points measured by a sensor unit 110 and may be coordinate points which are subjects of a straightness management. Further, the first and the second center point, a and b may be on the two planes, $P_A$ and $P_B$, respectively. A coordinate of a first center point, a may be expressed as $(T_a, L_a, H_a)$ and a coordinate of a second center point, b may be expressed as $(T_b, L_b, H_b)$.

The sensor unit 110 according to the present invention may be configured to measure 3-dimensional coordinates of the first and the second center point. Further, R of FIG. 5 may be used for setting an allowable maximum distance that a first and a second center point, a and b may be spaced apart at from a first and a second center point, A and B, respectively and may represent a center point maximum tolerance. Accordingly, when at least one of a first and a second center point, a and b is disposed beyond corresponding circles having a first or a second center point, A or B, as a corresponding center and a radius of a center point maximum tolerance, R, installation of mounting pin 1 may be determined to have a problem.

In particular, the upper and lower circles with A and B respectively as a center and a same radius of R may be called management circles and expressed as $C_A$ and $C_B$ respectively. Accordingly, when a first or a second center point, a or b is disposed beyond a corresponding $C_A$ or $C_B$, a controller 100 of a mounting pin straightness management system according to the present invention may be configured to activate a warning device 140.

Figure 6:
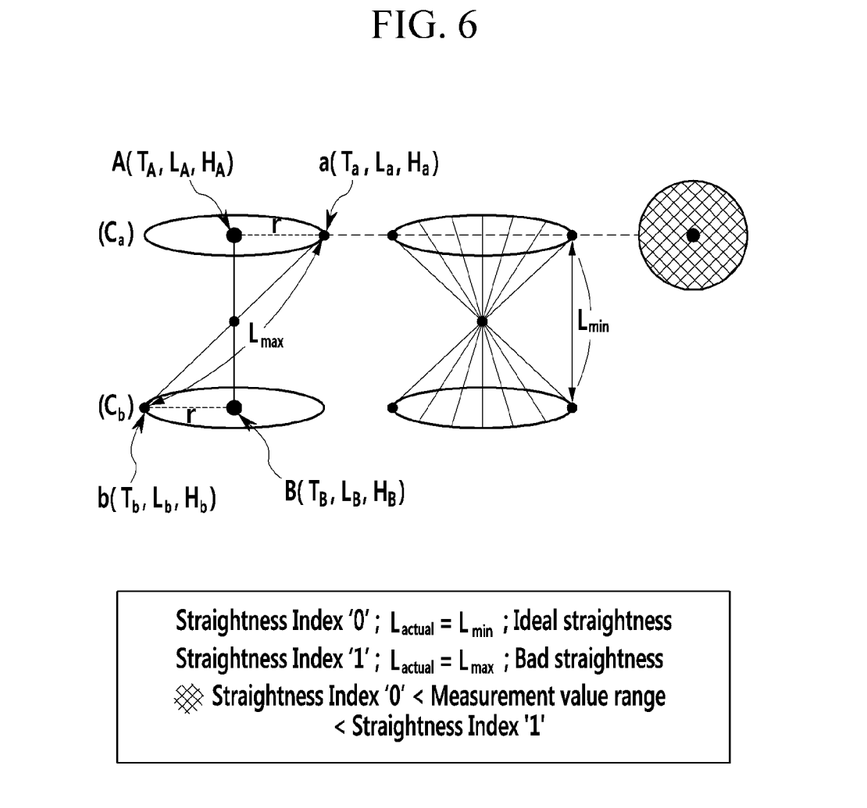
FIG. 6 is an exemplary drawing illustrating a straightness management tolerance r and a theoretical range of a straightness index calculated by a mounting pin straightness management system according to an exemplary embodiment of the present invention.

FIG. 6 is an exemplary drawing illustrating a straightness management tolerance r and a theoretical range of a straightness index calculated by a mounting pin straightness management system according to an exemplary embodiment of the present invention. Further, r of FIG. 6 may be a straightness management tolerance predetermined and upper and lower two circles, $C_a$ and $C_b$, with A and B respectively as a center and a same radius of r may be defined by r. Additionally, $C_a$ and $C_b$ may be approximate circles for a straightness management. In particular, a straightness Index (S.I.) may be calculated from T/L/H coordinate values of a first and a second center point, a and b and following formulas (1) through (4). However, formulas for calculating an S.I. are not limited only to formulas stated below.

$$L_{min} = \sqrt{(L_a - L_b)^2 + (T_a - T_b)^2 + (H_a - H_b)^2} = \sqrt{(H_a - H_b)^2} = H \quad \text{formula (1)}$$

$$L_{max} = \sqrt{(2r)^2 + (H)^2} \quad \text{formula (2)}$$

$$L_{actual} = \sqrt{(L_a - L_b)^2 + (T_a - T_b)^2 + (H_a - H_b)^2} \quad \text{formula (3)}$$

$$\text{Straightness Index} = \frac{L_{actual} - L_{min}}{L_{max} - L_{min}} \quad \text{formula (4)}$$

wherein, $L_{min}$ is a minimum distance between a first and a second center point, $L_{max}$ a maximum distance between a first and a second center point under the straightness management tolerance, r, $L_{actual}$ an actual distance (e.g., an absolute distance in 3-dimensional coordinate system) between a first and a second center point, and S.I. a straightness index calculated from the $L_{min}$, $L_{max}$ and $L_{actual}$.

When S.I. is 0, a straightness of a mounting pin 1 may be optimal and may correspond to FIG. 5, wherein there is no inclination of the mounting pin 1 to an H-axis. Further, when a first and a second center point are disposed respectively on circles for a straightness management, $C_a$ and $C_b$ defined by the straightness management tolerance, r as shown in FIG. 6, $L_{max}$ may be obtained and calculated from the formula (2). Since $L_{min}$ may be about the same as a distance H predetermined between two planes, $P_A$ and $P_B$, the S.I. may be related to a maximum distance ($L_{max}$) determined by the straightness management tolerance (r) and an actual distance ($L_{actual}$) between the first and the second center point.

As shown in FIG. 6, when a first and a second center point, a and b are disposed respectively on $C_a$ and $C_b$ and simultaneously a distance on 2-dimensional plane between two points acquired by projecting the first and the second center point onto any one of the two planes, $P_A$ and $P_B$ is maximum, theoretically the S.I. may become a maximum and the value is 1 from the formula (4). Since in this case $L_{actual} = L_{max}$. In other words, since $C_a$ and $C_b$ may be respectively on $P_A$ and $P_B$, they overlap each other when projected onto $P_A$ or $P_B$, and a distance between the first and the second center point may become a maximum when a line segment that connects a and b on the projection plane becomes a diameter of the overlapping circles.

Particularly, the diameter of the overlapping circles may have a length of 2r and since a height between $C_a$ and $C_b$ may be H and substantially constant, it may be determined that $L_{actual} = L_{max}$ from the formula (2). Numerator and denominator of the formula (4) may be substantially identical in this case and the S.I. may become 1. Accordingly, a theoretical range of the S.I. may be from 0 to 1. However, in an actual assembly process, when a first and a second center point, a and b are disposed inside a first and a second management circle, $C_A$ and $C_B$ respectively even though the S.I. exceeds 1, the value of the S.I. may be determined to be normal.

An exemplary mounting pin straightness management system according to the present invention may be configured to set, by a controller, a straightness management tolerance r to be less than a center point maximum tolerance R. In particular, a straightness tolerance may be set to be greater than 1 and when an r value of about 0.75 mm is set the straightness tolerance of 1.2 may be appropriate. In other words, in an actual assembly process with a mounting pin 1 satisfying the above condition the mounting process may be improved. In a rectangular box of FIG. 6 the theoretical range of the S.I. is shown together with a figure.

Figure 7:
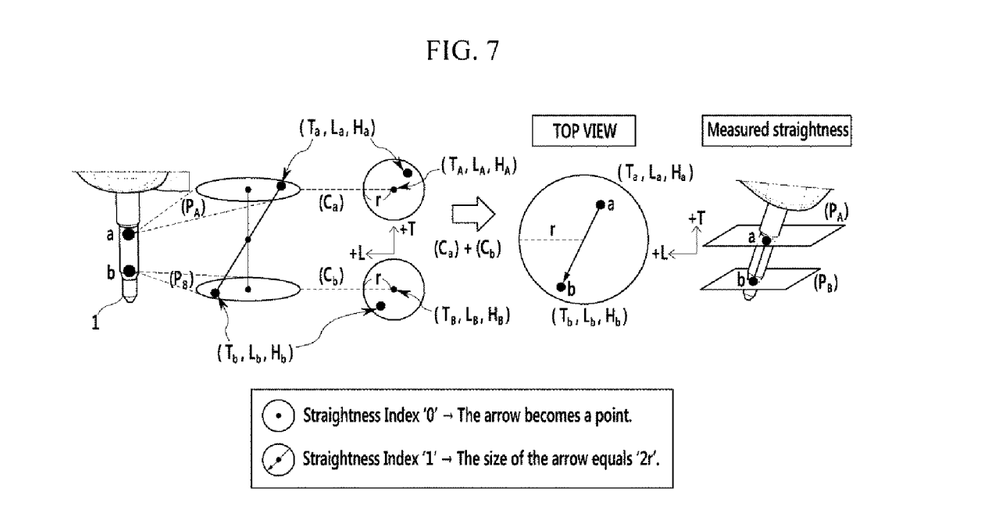
FIG. 7 is an exemplary drawing illustrating a straightness management tolerance r and a method of showing an inclined direction vector ab of a mounting pin straightness management system according to an exemplary embodiment of the present invention.

FIG. 7 is an exemplary drawing illustrating a straightness management tolerance r and a method of showing an inclined direction vector ab of a mounting pin straightness management system according to an exemplary embodiment of the present invention. In FIG. 7, as explained in FIG. 5, a first and a second center point (a, b) of two approximate circles formed from intersections of an exterior surface of a mounting pin 1 and two parallel planes ($P_A$ and $P_B$) perpendicular to H-axis, that is, a target length direction of the mounting pin 1 and spaced apart at a predetermined distance (H) from each other are shown.

In addition, the circles for a straightness management, $C_a$ and $C_b$ with centers of $A(T_A, L_A, H_A)$ and $B(T_B, L_B, H_B)$ respectively and about a same radius of a straightness management tolerance r explained in FIG. 6 are shown, too. The first and the second center point, a and b may be disposed respectively inside the $C_a$ and $C_b$ on the two corresponding planes, $P_A$ and $P_B$ respectively. However, when mounting variance of mounting pins 1 is substantially large, a or b may be disposed respectively outside $C_a$ or $C_b$. Accordingly, a straightness tolerance may be set greater than 1. Nonetheless, the first and the second center point may be disposed inside a first and a second management circle, $C_A$ and $C_B$, respectively.

In FIG. 7, a case is shown in which when the first and the second center point, a and b are disposed inside the circles for the straightness management, $C_a$ and $C_b$ and simultaneously $C_a$, $C_b$, and a line that connect the first and the second center point, a and b may be projected onto any one of the two planes, $P_A$ and $P_B$, an inclined direction vector, ab acquired by the projection passes through a center of the projected $C_a$ and $C_b$. The vector, ab may be a projection vector used to express an inclined direction vector of a mounting pin 1 shown in FIG. 7 on 2-dimensional plane of projection.

An exemplary mounting pin straightness management system according to the present invention may be configured to 2- or 3-dimensionally output the inclined direction vector onto a screen of a monitor unit 150. When the inclined direction vector is shown on 2-dimensional plane of projection as explained above, the inclined direction of the mounting pin 1 may be intuitively understood and used for the straightness management. A drawing farthest to the right in FIG. 7 shows a case in which an inclined direction vector, ab of a mounting pin 1 is expressed on a 3-dimensional space.

Figure 8:
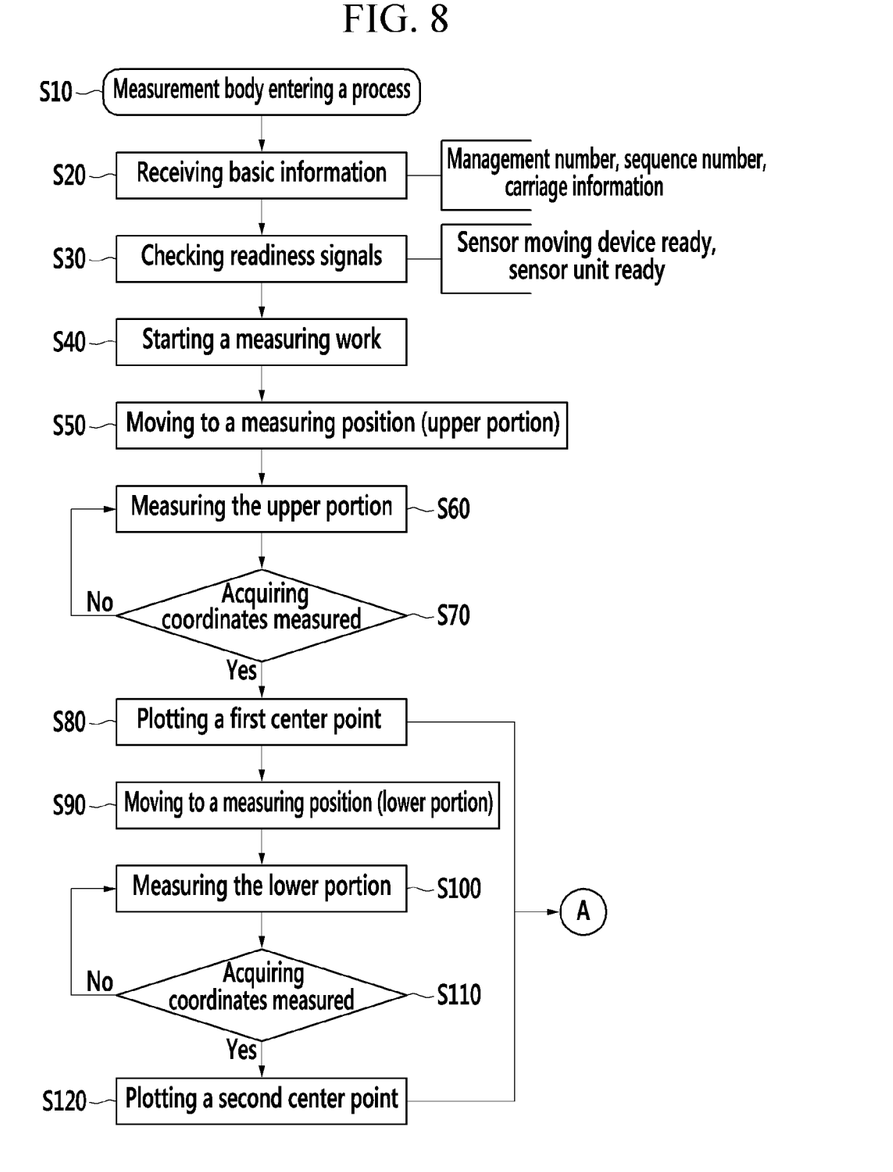
FIG. 8 is an exemplary drawing showing a part of a flow chart for an exemplary control method of a mounting pin straightness management system according to an exemplary embodiment of the present invention.
Figure 9:
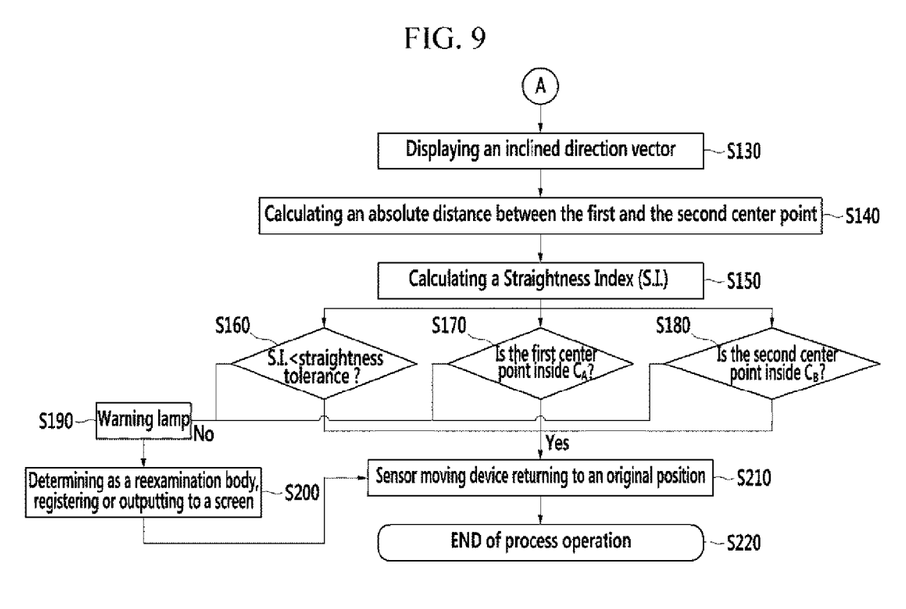
FIG. 9 is an exemplary drawing showing the remaining part of a flow chart for the exemplary control method of a mounting pin straightness management system according to an exemplary embodiment of the present invention.

FIG. 8 is an exemplary drawing showing a part of a flow chart for an exemplary control method of a mounting pin straightness management system according to an exemplary embodiment of the present invention. FIG. 9 is an exemplary drawing showing the remaining part of a flow chart for the exemplary control method of a mounting pin straightness management system according to an exemplary embodiment of the present invention.

First, a controller 100 may be configured to collect basic information (S20), when a measurement body fitted with at least one mounting pin 1 enters an assembly process (S10). A management number and a sequence number of the measurement body and information of a carriage, etc. may constitute the basic information. In addition, the controller 100 may be configured to receive a start signal of a measuring operation from a process controller 132.

In FIG. 8, the step has been omitted in which the controller 100 receives a start signal of a measuring operation from the process controller 132, but may be included in another exemplary embodiment. The controller 100 may pass through a step (S30) of detecting a readiness signal of a sensor unit 110 and a sensor moving device 120 and start the measuring operation (S40) by transmitting a measurement start order to the sensor unit 110 and the sensor moving device 120 after the readiness is confirmed, when the controller 100 receives the start signal of a measuring operation from a process controller 132 or confirms, by comparing the basic information, that the measurement body is the same as a body planned to be measured even though there is no start signal from the process controller 132.

In a measurement step, the sensor moving device 120 may be configured to move to a predetermined upper position (S50) for the sensor unit 110 to measure a first center point and the controller 100 may be configured to acquire 3-dimensional coordinates for the first center point (S70) after the sensor unit 110 measures the first center point (S60). When the controller 100 fails to acquire the coordinates, the measurement step (S60) will be repeated and when succeeding in acquiring them, the controller 100 may be configured to plot the first center point on a screen of a monitor unit 150 (S80).

Further, the sensor moving device 120 may be configured to move to a predetermined lower position (S90) for the sensor unit 110 to measure a second center point, the sensor unit 110 may be configured to measure the second center point (S100), and the controller 100 may be configured to acquire 3-dimensional coordinates for the second center point (S110). When the controller 100 fails to acquire the coordinates, the measurement step (S100) may be repeated and when succeeding in acquiring them, the controller 100 may be configured to plot the second center point on the screen of the monitor unit 150 (S120).

FIG. 8 and FIG. 9 show an exemplary embodiment in which the left and right sensor units 110 and the left and right sensor moving devices 120 respectively form a pair and the steps of the S50 through the S120 may be executed simultaneously in the left and the right side by the pair of the left and right sensor units 110 and the pair of the left and right sensor moving devices 120. In other words, a first and a second center point of a pair of a left and a right mounting pin 1 may be respectively measured in the left and the right side simultaneously.

In case another exemplary mounting pin straightness management system according to the present invention includes one sensor unit 110 and one sensor moving device 120 respectively, the system may further include a step for the sensor moving device 120 to move to a predetermined measurement position of a right mounting pin 1 for a measurement of a right mounting pin 1 after the steps of the S50 through the S120 are firstly executed for a measurement of a left mounting pin 1 and subsequently perform the steps corresponding to the S50 through the S120.

Accordingly, the measurement positions may be predetermined such that a straightness index, S.I. may be about 0 when the sensor unit 110 measures 3-dimensional coordinates of a first and a second center point of a master pin with a condition of having a most ideal straightness. The measurement positions may be expressed as 3-dimensional coordinates of a specific reference point of the sensor unit 110 (e.g., a measuring point of a laser sensor). An origin of the 3-dimensional coordinate system may be an initial position of the specific reference point of the sensor unit 110 before the sensor unit 110 moves for a measurement.

Referring to FIG. 9 in succession, a vector, ab that connects a first and a second center point, a and b which were plotted in steps of S80 and S120 may be displayed on an imaginary 3-dimensional space or a 2-dimensional plane, $P_A$ or $P_B$ (S130). The display may be performed on a screen of a monitor unit 150 by the controller. In addition, the controller 100 may be configured to calculate an actual distance (or an absolute distance), $L_{actual}$ between a first and a second center point (S140) and a straightness index, S.I. (S150) using coordinate values of the first and the second center point, $(T_a, L_a, H_a)$ and $(T_b, L_b, H_b)$ received from the sensor unit 110. These calculated values may be output to a screen of the monitor unit 150.

After the display of the inclined direction vector, ab and the calculations, the controller 100 may pass through a step of determining whether the S.I. is within a predetermined straightness tolerance (S160), whether a first center point, $a(T_a, L_a, H_a)$ is within a corresponding first management circle, $C_A$ (S170) and whether a second center point, $b(T_b, L_b, H_b)$ is within a corresponding second management circle, $C_B$ (S180).

Furthermore, when at least any one of the determinations is negative, a warning device 140 (e.g. a warning lamp) may be activated by the controller (S190) and a measurement body at which the mounting pin 1 is mounted may be determined as an offline reexamination body, registered in a storage device of the controller 100, and output to a screen of a monitor unit 150 (S200). Subsequently, the sensor moving device 120 may be configured to return to an original position (S210) and the process may terminate (S220). When all of the determinations show positive results, the sensor moving device 120 may be configured to return to an original position (S210) and the process may end (S220) without the steps of S190 and S200.

As explained in detail, a mounting quality management of a suspension module 4 may be possible and may correct the problem of unexpected stops of an assembly line and the steering pull problem while driving a completed vehicle, since a mounting variance management of mounting pins 1 with a condition of BIW assembly, in other words, a straightness management may become possible and an inclined direction of a mounting pin 1 may be intuitively understood according to the present invention.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A mounting pin straightness management system that calculates and manages straightness index of at least one mounting pin by measuring 3-dimensional coordinates of center points of the at least one mounting pin, the mounting pin straightness management system comprising:
  a sensor unit configured to measure 3-dimensional coordinates for a first and a second center point (a, b) of two approximate circles formed from intersections of an exterior surface of the at least one mounting pin and two parallel planes ($P_A$ and $P_B$) perpendicular to a target length direction of the at least one mounting pin and spaced apart at a predetermined distance (H) from each other; and
  a controller configured to control a sensor moving device which moves the sensor unit to a predetermined position during a measurement,
  wherein the controller is further configured to calculate a straightness index (S.I.) related to a maximum distance ($L_{max}$) between the first and the second center point under a straightness management tolerance (r) and an actual distance ($L_{actual}$) between the first and the second center point by receiving the 3-dimensional coordinates of the first and the second center point from the sensor unit,
  wherein the S.I. is calculated from $$S.I. = \frac{L_{actual} - L_{min}}{L_{max} - L_{min}},$$

where $L_{min}$=H.

2. The mounting pin straightness management system of claim 1, further comprising:
  a basic information/process controller configured to provide the controller with basic information regarding a measurement body at which the at least one mounting pin is mounted or transmit a starting signal of a measuring operation to the controller.

3. The mounting pin straightness management system of claim 1, further comprising: a warning device configured to transmit a warning to the controller when the S.I. exceeds a predetermined straightness tolerance or at least one of the first and the second center point is disposed beyond a corresponding first or second management circle ($C_A$, $C_B$).

4. The mounting pin straightness management system of claim 1,
  wherein the controller is configured to calculate an inclined direction vector (ab) formed by projecting a connecting line of the first and the second center point onto any one of the two planes ($P_A$ and $P_B$); and
  wherein the management system further includes a monitor unit configured to output the $L_{actual}$, the S.I., or the inclined direction vector ab to a screen.

5. The mounting pin straightness management system of claim 1,
  wherein the controller is further configured to control the sensor moving device to move the sensor unit to an original position after the measurement finishes.

6. The mounting pin straightness management system of claim 1, wherein the sensor unit includes a 3-dimensional laser sensor.

7. The mounting pin straightness management system of claim 5,
  wherein a pair of left and right mounting pin are installed symmetrically, and
  wherein left and right sensor units and left and right sensor moving devices respectively form a pair corresponding to the pair of the mounting pins and are configured to operate simultaneously.

8. A control method of a mounting pin straightness management system calculating and managing straightness index of at least one mounting pin by measuring 3-dimensional coordinates for center points of the at least one mounting pin, wherein the control method of the mounting pin straightness management system includes:
  measuring, by a sensor unit, 3-dimensional coordinates of a first and a second center point (a, b) of two approximate circles formed from intersections of an exterior surface of the at least one mounting pin and two parallel planes ($P_A$ and $P_B$) perpendicular to a target length direction of the at least one mounting pin and spaced apart at a predetermined distance (H) from each other;
  controlling, by a controller, a sensor moving device which moves the sensor unit to a predetermined position during a measurement; and
  calculating, by the controller, a straightness index (S.I.) related to a maximum distance ($L_{max}$) between the first and the second center point under a straightness management tolerance (r) and an actual distance ($L_{actual}$) between the first and the second center point by receiving the 3-dimensional coordinates of the first and the second center point from the sensor unit,
  wherein the S.I. is calculated from $$S.I. = \frac{L_{actual} - L_{min}}{L_{max} - L_{min}},$$

where $L_{min}$=H.

9. The control method of the mounting pin straightness management system of claim 8, further comprising:
  determining, by the controller, whether the S.I. is within a predetermined straightness tolerance;
  determining, by the controller, whether both of the first and the second center point are within corresponding first and second management circle ($C_A$, $C_B$) respectively; and
  activating, by the controller, a warning device when at least any one of the two determinations is negative.

10. The control method of the mounting pin straightness management system of claim 9, further comprising:
  determining, by the controller, a measurement body at which the at least one mounting pin is mounted as an offline reexamination body when the warning device is activated or outputting contents of the determinations to a screen of a monitor unit.

11. The control method of the mounting pin straightness management system of claim 8, further comprising:
- calculating, by the controller, an inclined direction vector (ab) formed by projecting a connecting line of the first and the second center point onto any one of the two planes ($P_A$ and $P_B$); and
- outputting, by the controller, the $L_{actual}$, the S.I., or the inclined direction vector (ab) to a screen.

12. The control method of the mounting pin straightness management system of claim 8, further comprising:
- collecting, by the controller, basic information regarding a measurement body from a basic information process controller;
- receiving, by the controller, a readiness signal of the sensor moving device or the sensor unit;
- transmitting, by the controller, a start order of a measuring operation to the sensor moving device or the sensor unit; and
- moving, by the controller, the sensor moving device to an original position after the measurement finishes.

13. A non-transitory computer readable medium containing program instructions executed by a controller to calculate and manage straightness index of at least one mounting pin by measuring 3-dimensional coordinates of center points of the at least one mounting pin, the computer readable medium comprising:
- program instructions that control a sensor unit to measure 3-dimensional coordinates for a first and a second center point (a, b) of two approximate circles formed from intersections of an exterior surface of the at least one mounting pin and two parallel planes ($P_A$ and $P_B$) perpendicular to a target length direction of the at least one mounting pin and spaced apart at a predetermined distance (H) from each other;
- program instructions that control a sensor moving device which moves the sensor unit to a predetermined position during a measurement; and
- program instructions that calculate a straightness index (S.I.) related to a maximum distance ($L_{max}$) between the first and the second center point under a straightness management tolerance (r) and an actual distance ($L_{actual}$) between the first and the second center point by receiving the 3-dimensional coordinates of the first and the second center point from the sensor unit,
- wherein the S.I. is calculated from $$S.I. = \frac{L_{actual} - L_{min}}{L_{max} - L_{min}},$$

where $L_{min}$=H.

14. The non-transitory computer readable medium of claim 13, further comprising:
- program instructions that calculate an inclined direction vector (ab) formed by projecting a connecting line of the first and the second center point onto any one of the two planes ($P_A$ and $P_B$); and
- program instructions that output the $L_{actual}$, the S.I., or the inclined direction vector ab to a screen.

15. The non-transitory computer readable medium of claim 13, further comprising:
- program instructions that control the sensor moving device to move the sensor unit to an original position after the measurement finishes.

16. The non-transitory computer readable medium of claim 13, wherein the sensor unit includes a 3-dimensional laser sensor.

* * * * *